Sept. 24, 1963     K. F. OLDENBURG     3,104,808
CALCULATING MACHINE Filed Dec. 26, 1961                                                                       7 Sheets-Sheet 1

INVENTOR.
KENNETH F. OLDENBURG
BY
ATTORNEY

Sept. 24, 1963 K. F. OLDENBURG 3,104,808
CALCULATING MACHINE
Filed Dec. 26, 1961 7 Sheets-Sheet 2

INVENTOR
KENNETH F. OLDENBURG
BY
ATTORNEY

Sept. 24, 1963 K. F. OLDENBURG 3,104,808
CALCULATING MACHINE

Filed Dec. 26, 1961 7 Sheets-Sheet 4

INVENTOR.
KENNETH F. OLDENBURG

BY

*Fred H. Schmidt*

ATTORNEY

Sept. 24, 1963

K. F. OLDENBURG

3,104,808

CALCULATING MACHINE

Filed Dec. 26, 1961

INVENTOR.
KENNETH F. OLDENBURG

BY

ATTORNEY

*INVENTOR*
*KENNETH F. OLDENBURG*

BY

*ATTORNEY*

United States Patent Office 3,104,808
Patented Sept. 24, 1963

3,104,808
CALCULATING MACHINE
Kenneth F. Oldenburg, Monterey Park, Calif., assignor to Clary Corporation, San Gabriel, Calif., a corporation of California
Filed Dec. 26, 1961, Ser. No. 162,155
6 Claims. (Cl. 235—60.31)

This invention relates to calculating machines and has particular reference to accumulators of the crawl type wherein each denominational order includes a register gear which is driven through a differential mechanism jointly by a digitizing gear located in the same denominational order and by the register gear in the next lower order.

Such accumulators, particularly of the orbital or entocyclic type wherein eccentrically related intermeshing internal and external gears are employed, are, in themselves, relatively simple and reliable because of the direct geared relation between the various denominationally arranged register gears. However, heretofore, totaling and subtotaling of crawl type accumulators have presented problems. These have arisen because the register gear in each order receives a fractional entry of one-tenth (in decimal accumulators) the movement of the next lower order register gear, one-hundredth the movement of the second lower order register gear, etc., so that it is possible for a register gear to register, say, 9.99. Now, in totaling and subtotaling operations, the gears are driven in a subtractive direction until zero stop shoulders on or associated with the register gears engage total stops. Thus, in the case of a register gear which registers 9.99, it would have to be retracted beyond nine increments in order to effect a proper total. However, since, at the registration of 9.99, the associated zero stop would be practically at zero, the total stop would, under normal circumstances, block retraction of such register gear and an erroneous total or subtotal would result.

Heretofore, accumulators of the above type have generally been constructed to sequentially total the register gears order by order commencing with the lowermost denominational order so as to remove any fractional carries from each such register gear before commencing totaling in the respective order. However, such accumulators require appreciable time to effect complete totaling or subtotaling, particularly in machines having a relatively large number of denominational orders.

The above problem has been solved by the invention disclosed and claimed in the copending application of R. E. Busch, Serial No. 130,078, filed August 8, 1961, by initially controlling positioning of the total stops during totaling and subtotaling operations in accordance with the values registered in the accumulator.

The mechanism of the above Busch application works satisfactorily and is superior to prior mechanisms for effecting totaling and subtotaling of crawl type accumulators of the foregoing type. However, when utilizing inexpensive parts having relatively large tolerances or inaccuracies in dimensions, it has been found that frictional drag or binding forces may be set up in the entrained gearing or bearings which could cause malfunctioning during totaling and subtotaling.

It therefore becomes a principal object of the present invention to overcome the above noted difficulty in a crawl type accumulator of the above type.

Another object is to prevent drag or binding forces set up in a crawl type accumulator of the above type from interfering with proper totaling and/or subtotaling of the accumulator.

Another object is to provide a simple and reliable accumulator whose parts may have relatively large dimensional tolerances.

The manner in which the above and other objects of the invention are accomplished will be readily understood on reference to the following specification when read in conjunction with the accompanying drawings, wherein:

FIG. 20 illustrates a timing chart of the machine.

General Design

Referring to the drawings, the machine is of the ten-key type wherein the digits of a value are entered sequentially through ten amount keys, certain of which are indicated at 11, which keys range in value from 0 to 9. Operation of the machine to perform entry and total or subtotal functions is controlled by two depressible control bars 711 and 712 (FIG. 6).

Depression of an amount key sets an appropriate stop pin 12 (FIGS. 1 and 2) in a pin carriage generally indicated at 13, which shifts laterally of the machine into cooperative relation with printing sectors 14. Each of the latter sectors carries a series of type characters 15 on its periphery, ranging in value from 0 to 9, the character 0 being located at the clockwisemost location relative to the rest of the series.

The printing sectors cooperate with printing mechanism, generally indicated at 16, to print amounts registered by the sectors 14 onto a paper strip 17. The sectors also cooperate with an accumulator, generally indicated at 18, to enter amounts therein or to remove accumulated amounts during totaling and subtotaling operations.

Figures 2, 3, 4, 5:
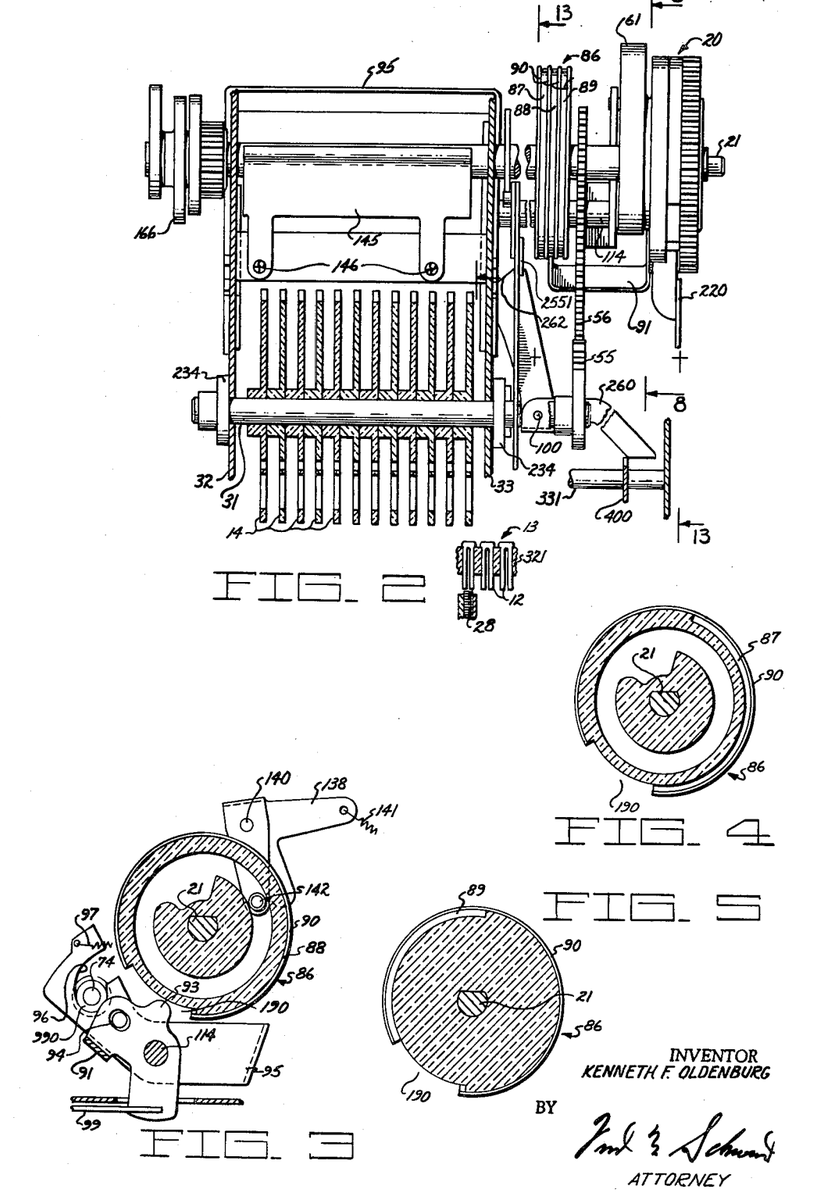
FIG. 2 is a sectional plan view taken substantially along the line 2—2 of FIG. 1.
FIG. 3 is a sectional view taken along the line 3—3 of FIG. 10, illustrating the accumulator control cam and associated cam follower.
FIG. 4 is a sectional view through the accumulator control cam and is taken along the line 4—4 of FIG. 10.
FIG. 5 is another sectional view through the accumulator control cam and is taken along the line 5—5 of FIG. 10.
Figures 6, 7, 8, 9:
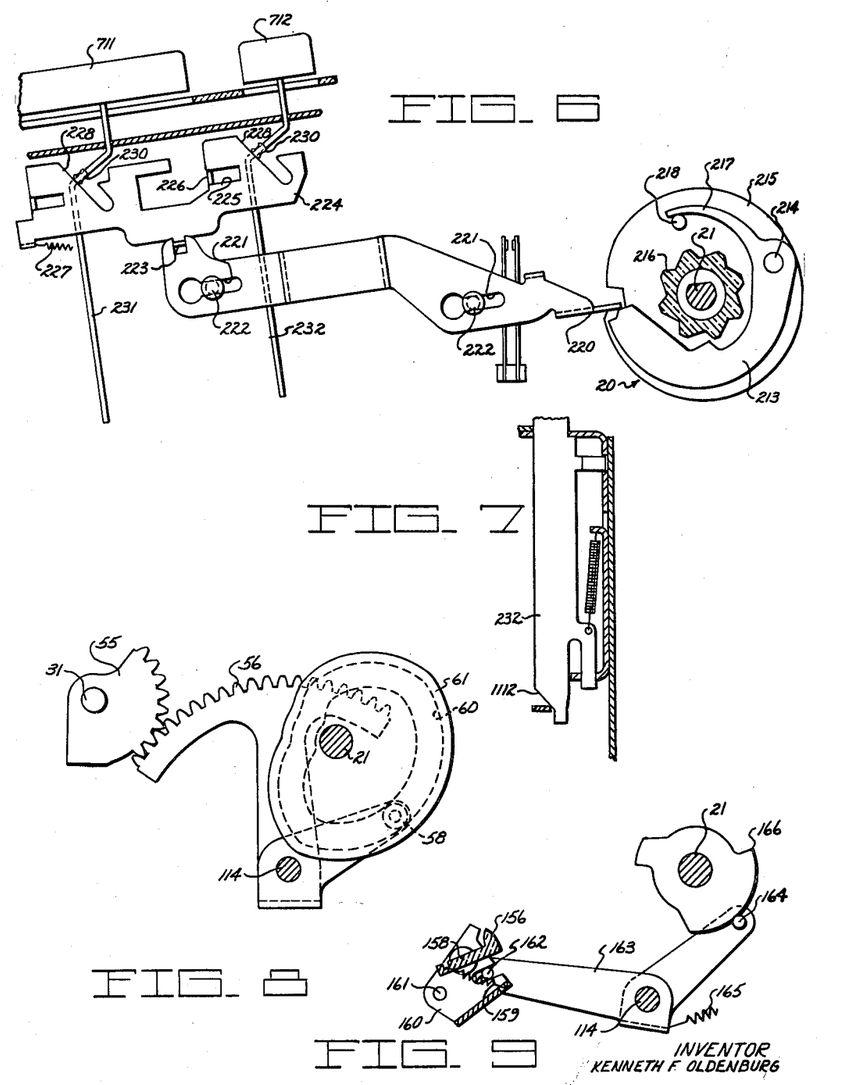
FIG. 6 is a sectional view illustrating the machine clutch and controls therefor.
FIG. 7 is a transverse sectional view through a part of the keyboard.
FIG. 8 is a sectional side view of the main sector drive mechanism and is taken substantially along the line 8—8 of FIG. 2.
FIG. 9 is a sectional view of the aligner operating mechanism.

The machine is driven by an electric motor (not shown) through a cyclically operable clutch generally indicated at 20 (FIGS. 2 and 6). Upon depression of either control bar 711 and 712, the clutch will be engaged to drive a main shaft 21 one complete revolution. The shaft carries various cams and gears (to be described hereinafter) for driving different operating units of the machine in proper timed relation.

Keyboard

The amount keys are mounted on key stems 23 (FIG. 1) slideable vertically in slots provided in upper and lower frame plates 24 and 25, respectively, the frames being suitably secured to the framework of the machine. Tension springs 26, attached at their ends to the lower frame plate 25, extend under the key stems to normally hold the amount keys in raised condition.

Each key stem has an extension, i.e., 27, which is attached to the upper end of a respective flexible cable 28. The various cables are vertically aligned with each other and are slideably mounted for endwise movement in grooves 29 formed in a guide block 30 attached to the lower plate 25. The various cables terminate in an arcuate pattern concentric with a shaft 31 which is rotatably mounted in bearings formed in side frame plates 32 and 33 (FIG. 2) forming part of the machine framework.

Pin Carriage

The pin carriage 13 is formed of an arcuate body 321 slideably mounted at its lower end on a stationary rod 331 for movement transversely of the machine. The pin carriage has an extension 34 at its upper end which is guided along a slot formed in a channel member 36 extending across the machine framework.

Figure 1:
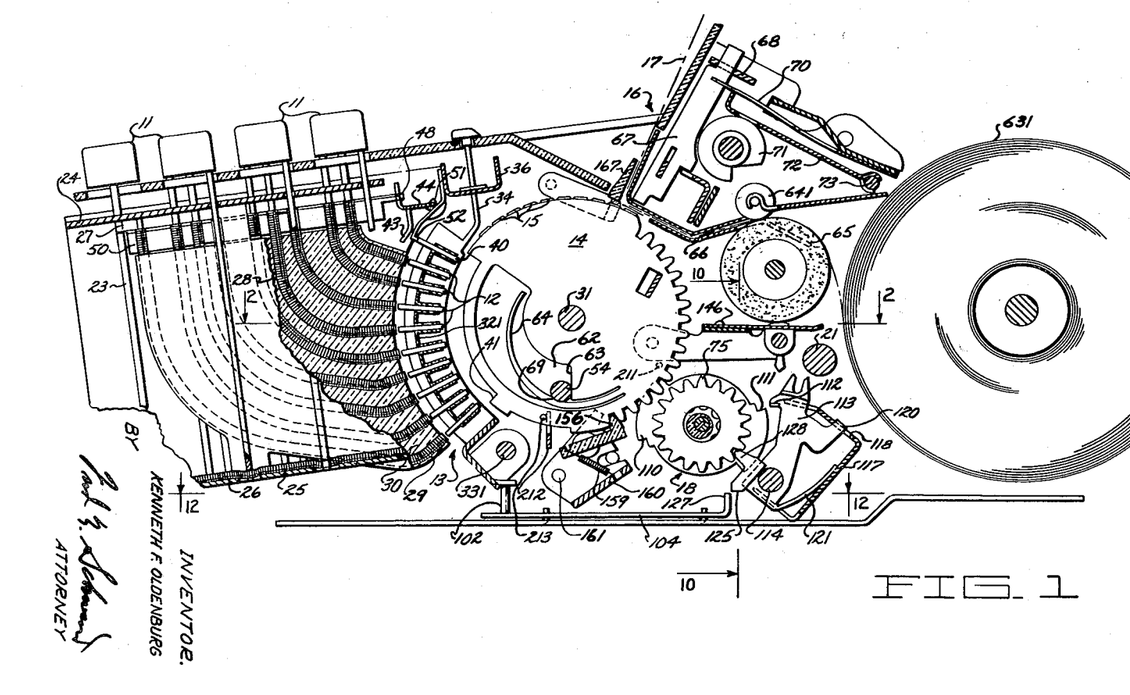
FIG. 1 is a longitudinal sectional view of an adding machine embodying a preferred form of the present invention.

The pin carriage has a plurality of vertical columns of stop pins 12 as indicated partly in FIGS. 1 and 2, which pins extend radially of the shaft 31 and are slideable endwise in grooves formed in the carriage body. The stop pins are located in horizontal rows aligned with the lower ends of the flexible cables 28. Thus, upon depression of a selected amount key 11, the respective cable 28 will be moved endwise to likewise move an aligned stop pin from its normal ineffective position shown in FIG. 1 to a position wherein it forms an abutment in the path of a shoulder 41 formed on each of the printing sectors 14. The pins 12 are constructed to frictionally engage the sides of their respective grooves and thereby remain in their endwise adjusted positions until returned in the latter stages of a machine cycle as an incident to return of the pin carriage to its home position.

An additional horizontally extending row of escapement stop pins 40 are provided above the remaining pins 12. Such pins are aligned with the vertical columns of pins 12 and are likewise slideably mounted in grooves formed in the pin carriage body 321 for endwise movement by a finger 43 of a bail 44. The bail is pivotally supported at 51 and is pivotally connected at 48 to a bail 50 which is pivotally supported in a manner not shown in the machine framework for movement about an axis extending lengthwise of the machine. The bail 50 underlies the extensions 27 of all of the amount keys. Thus, upon depression of any amount key to set an appropriate stop pin 12, the bail 50 is rocked downward, causing the finger 43 to depress an aligned escapement pin 40 whereby the pin carriage may escape one column to the left under the action of the suitable spring (not shown).

Upon depression of the amount key representing the 9's digit, only the pin 40 which allows the pin carriage to escape will be depressed. In this case, the appropriate sector will be yieldably driven nine increments whereupon it will be arrested by engagement of a pin 211 thereon against a stationary comb plate 212 which extends transversely across the machine.

Main Drive and Controls Therefor

The machine is driven by a suitable motor (not shown) through the clutch 20 (FIGS. 2 and 6). The latter comprises a pawl 213 pivotally supported at 214 on a disc 215 attached to the drive shaft 21. The pawl is urged toward driving engagement with a motor driven drive ratchet 216 by a yieldable tail 217 on the pawl, which tail engages a pin 218 on the disc. However, normally, the pawl is held out of engagement with the driving ratchet by a clutch dog 220. The latter is provided with slots 221 which slideably embrace frame studs 222 whereby the guide the clutch dog in and out of blocking relation with the clutch pawl 213.

The clutch dog is coupled at 223 to a control slide 224 having slots 225 which are guided over stationary projections 226 extending from the machine framework, the slide being urged to the right in FIG. 6 by a tension spring 227 to normally maintain the clutch in its illustrated disengaged condition.

The control slide 224 has inclined camming surfaces 228 engageable by projections 230 extending laterally from stems 231 and 232 on which the control bars 711 and 712, respectively, are mounted. Thus, when one or the other of such control bars is depressed, the clutch dog 220 will be withdrawn to cause a cycle of operation.

Printing Sector Drive

The various printing sectors 14 are independently and rotatably mounted on the shaft 31 and are yieldably driven clockwise from their home positions illustrated in FIG. 1 during item entry operations by a bail rod 54. The latter is integral at its ends with eccentric shaft extensions 233 (FIG. 13) journaled in bearings formed in spaced arms 234 (FIG. 2) suitably fastened to the shaft 31. An arm 235 is fastened to one of the shaft extensions 233 and is normally held in its position shown in FIG. 13 against a pin 236 on one of the arms 234 by a tension spring 237 extending between the two arms. The bail rod 54 is therefore normally held in a lowered position shown in FIG. 1 in engagement with detenting shoulders 69 formed on flexible tails 64 extending integrally from the different sectors.

The shaft 31 carries at its extreme right-hand end a gear sector 55 (FIG. 8). Sector 55 meshes with a second gear sector 56 pivoted on a shaft 114 and carrying a follower roller 58 which engages a cam groove 60 formed in a cam 61 suitably attached to the drive shaft 21.

As seen in FIG. 20 (item 2), the bail rod 54 is rocked clockwise by the arms 234 from its illustrated home position during a period extending through approximately 75° to 180° of the cycle. During this period, it will correspondingly rotate the sectors until each strikes an aligned depressed stop pin 12 in the pin carriage or until the pin 211 strikes the comb plate 212 during digit entry operations. Thereupon, detenting shoulders 69 on the tails will yield, permitting the bail rod to proceed to the limit of its excursion.

From approximately 230° to 300°, the bail rod will be returned counterclockwise to its home position. During this period, the frictional engagement between the bail rod and the tails 64 will normally first drive the sectors 14 to their home positions which, in each case, is controlled by pins 213 integrally formed on the sectors coming to rest against the comb plate 212. The arresting of the sectors by pins 213 will allow the rod 54 as it continues homeward to slide along the tails 64, coming to rest behind the detenting or driving shoulders 69.

Printer and Paper Feed

The paper strip 17 is fed from a supply roll 631 between gripping feed rolls 641 and 65 and through a guideway 66, past a printing station located between the printing sectors 14 and respective printing hammers 67. From the printing station, the strip is passed upwardly behind a transparent tear-off bar 167.

The hammers 67 are suitably guided in a frame 68 for endwise movement radially of the sectors 14, toward and away from contact with the paper strip 17. Leaf spring elements 70 urge the hammers downwardly, but are normally restrained by a rotatable cam element 71 which operates against the elements 70 through a follower bail 72 pivoted at 73.

The cam 71 is suitably entrained through gearing (not shown) with the shaft 21 and during the printing phase (FIG. 20, item 1) which occurs at approximately 210° in the machine cycle, the cam permits the springs 70 to impel the hammers 67 downwardly, thus causing an imprint of selected type characters 15 onto the strip through a suitable printing ribbon (not shown).

Accumulator

The accumulator 18 (FIGS. 1 and 14 to 16) is of the entocyclic or orbital crawl carry type and comprises an accumulator shaft 74 guided for movement toward and away from the sectors 14 by suitable guide slots (not shown) formed in side plates 32 and 33 so as to permit meshing and demeshing of digitizing gears 75, forming part of the accumulator, with respective gear tooth sections on the printing sectors 14.

Each denominational order of the accumulator comprises a register gear 76 having a set of 20 internal teeth 77 and an eccentric hub 240 thereon, the latter being rotatable on the shaft 74. The gear 76 is also provided with a cylindrical flange 239 on which an adjacent digitizing gear is rotatably mounted.

A floating gear 84 is rotatably mounted on each hub 240. The latter gear has a set of 18 teeth 171 on the left-hand side thereof which mesh with the internal teeth 77 of the adjacent register gear 76. Each gear 84 also has a set of nine semicircular tooth formations 241 which mesh with nine equi-spaced pins 242 extending integrally from the side of the adjacent digitizing gear 75. Accordingly, the gear 84 effects a nine to ten actual ratio but a one to one digital increment ratio between each digitizing gear and the associated register gear 76 in the same denominational order.

From the above, it will be seen that each register gear 76 receives an equal incremental advance from its associated digitizing gear 75 and a one-tenth incremental advance from the register gear 76 in the next lower denominational order. Thus, a tens carry is effected simultaneous with digitation in either of opposite directions depending on whether additive or subtractive entries are being made.

Accumulator Controls

The accumulator is meshed and demeshed with the printing sectors 14 at different times as set forth in items 6, 7 and 8 in the timing diagram of FIG. 20 depending on whether additive or subtractive entries are being made or whether totaling or subtotaling operations are being performed. For this purpose, an accumulator control cam 86 (FIGS. 2 to 5) is attached to the main shaft 21 and is provided with three different camways 87, 88 and 89 on its periphery, the camways being separated by broken flanges 90.

A cam follower bail 91 is mounted on a stationary shaft 114 for both pivotal and longitudinal movement along the shaft. A follower nose 93 on the bail may be positioned to follow a selected camway. The bail is connected through a pin and slot connection 94 with a camming bail 95 which is also pivoted on the shaft 114 but suitably prevented for moving therealong. Bail 95 is provided with spaced arms having cam grooves 96 therein which embrace rollers 990 on the opposite ends of the accumulator shaft 74. Accordingly, when the bails 91 and 95 are rocked counterclockwise by a selected camway, against the action of a tensioned spring 97, they will cam the accumulator into mesh with the printing sectors.

It will be noted that the flanges 90 are broken at 190 to permit lateral shifting of the follower bail 91 when the machine is in its full cycle position.

Means are provided to shift the cam follower bail 91 into cooperative relation with any of the camways on cam 86. For this purpose, the bail is engaged by a bifurcated lever 99 (FIGS. 3 and 12) pivoted at 100 and urged counterclockwise by a tensioned spring 101 tending to locate the nose of the cam follower bail 91 in engagement with the left-hand camway 87 of the control cam 86. In such case, the accumulator would be meshed with the printing sectors during the return or counterclockwise rocking movements thereof as occurs during additive entry operations (see item 8, FIG. 20).

Now, the pin carriage 13 carries a stud 102 (FIGS. 1 and 12) which is embraced within a slot 103 in a blocking plate 104. The latter is slideably mounted for fore and aft movement on a bottom frame plate 105 of the machine through pin and slot connections 106. When the pin carriage is moved into its right-hand or home position depicted partly in FIG. 2, the stud 102 cams the blocking plate forwardly into its position shown in FIG. 12, causing an ear 107 to cam against an inclined edge 108 on the lever 99, thus moving the latter into its neutral illustrated position wherein the cam follower bail 91 is positioned in cooperative relation with the central camway 88 of cam 86. It will be noted on reference to FIGS. 3 and 20, item 7, that the camway 88 has a high portion extending around the major portion of its periphery whereby to maintain the accumulator in mesh with the printing sectors during both the advance and retraction of the latter. This occurs during subtotaling operations of the accumulator.

Thus, when no amount has been entered into the pin carriage, i.e., when the pin carriage is in its home position and the clutch is engaged by depression of the bar 711 for effecting additive entry or subtotaling operations, a subtotal operation will ensue. However, when an amount has been entered into the pin carriage, i.e., when the latter has moved out of its home position, the blocking plate will be moved rearwardly by the stud 102 on the pin carriage, permitting the lever 99 to rock counterclockwise, thus moving the cam follower bail 91 into cooperative relation with the cam 87 to effect an add entry operation.

The control bar 712 (FIG. 6) is effective to cause subtractive entry and total operations. The stem 232 of the latter is suitably guided for vertical movement as shown in FIG. 7 and has a camming edge 1112 engageable with the lever 99 so that depression of the bar will cam the latter lever clockwise beyond its position shown in FIG. 12 whereby to position the cam follower bail 91 in cooperative relation with the camway 89 of the cam 86. As shown in FIGS. 5 and 20, item 6, the camway 89 has a high portion so located as to mesh the accumulator with the printing sectors during the early portion of the cycle or during advance of the sectors 14 so as to effect either a subtractive entry or totaling operation, as will be described in detail hereinafter.

Totaling and Subtotaling Controls

In accordance with the present invention, means are provided to effect a total or subtotal of the crawl type accumulator within the same cyclic period as in digitizing operations. For this purpose, each register gear 76 has a broken or stepped flange 110 thereon (FIGS. 1, 16 and 21 to 24). The flange is divided into two diametrically opposed high levels 110 H, two diametrically opposed intermediate levels 110 I and two diametrically opposed low levels 110 L. A zero stop shoulder 111 is formed between each high and intermediate levels.

Figures 14, 15, 16, 17:
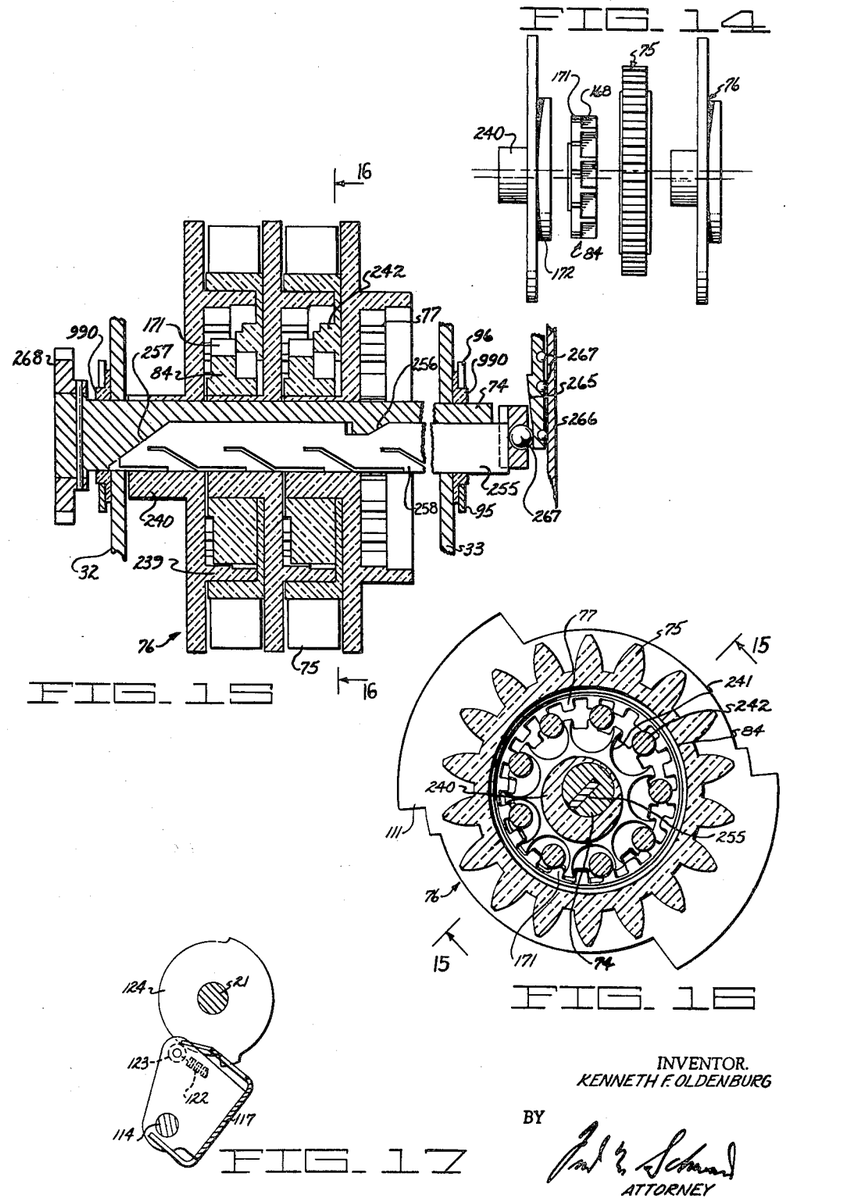
FIG. 14 is an exploded view illustrating different elements of the accumulator.
FIG. 15 is an enlarged sectional view, with parts broken away, through the accumulator and is taken along the line 15—15 of FIG. 16.
FIG. 16 is a transverse sectional view taken along the line 16—16 of FIG. 15.
FIG. 17 is a side view of the total stop positioning control mechanism.

As described heretofore, the accumulator is arranged to be totaled in a subtractive direction, i.e., counterclockwise when viewed in FIGS. 1 and 16, and is returned to zero registration during totaling and subtotaling operations independently of the sectors 14 until one or the other zero stop shoulder 111 on each register gear 76 is arrested by an ear 112 on an associated total stop lever 113, the latter levers being positioned in the paths of the shoulders 111 during totaling and subtotaling operations only, as will be described hereinafter.

During totaling and subtotaling operations, the bail rod 54 (FIGS. 1 and 13) is uncoupled from the detent shoulders 69 of the sectors 14 and, for this purpose, a pin 250 (FIG. 13) is attached to arm 235 directly below a camming lever 251 which is pivotally supported on the shaft 114. The latter is adapted to be coupled, during totaling and subtotaling operations, to a cam follower lever 252 also pivoted on the shaft 114 and cooperating with a cam 253 fastened to the drive shaft 21. The lever 251 has pivotally mounted thereon at 254 a coupling arm 2551 having a pin 256 which is normally held out of engagement with slots 257 in the arms 251 and 252 by a tension spring 1258 extending between the arms 251 and 2551.

Figures 12, 13:
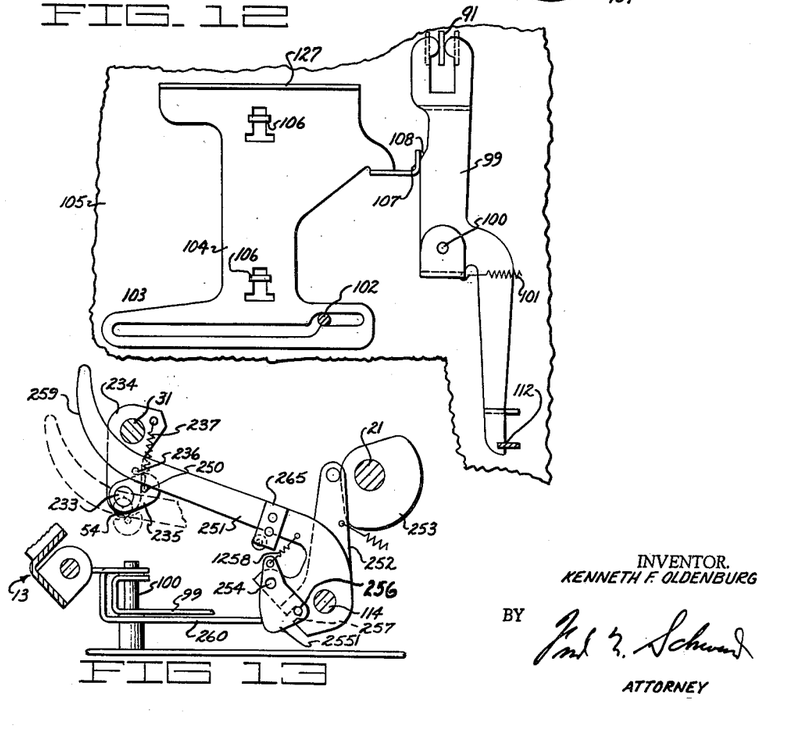
FIG. 12 is a sectional plan view taken substantially along the line 12—12 of FIG. 1, illustrating part of the accumulator controls.
FIG. 13 is a sectional side view taken substantially along the line 13—13 of FIG. 2, illustrating the sector drive disabling mechanism.

When the pin carriage 13 is moved into its illustrated home position (FIGS. 2 and 13), a part 400 thereon engages a lever 260 pivotally supported at 100, thereby camming the latter counterclockwise to move a camming surface 262 thereon into engagement with an arcuate edge of the coupling arm 2551, causing the same to move pin 256 into coupling engagement with the arm 252 as shown in FIG. 13. Therefore, at the start of an ensuing totaling or subtotaling operation, the arm 251 will move as a unit with cam follower 252, camming the arm 235 clockwise approximately 90° to raise the bail rod 54 out of engagement with the various detenting shoulders 69 on the sectors 14. As shown in items 9 of FIG. 20, the arm 251 will be held in rocked position until approximately 220°. Also, it will be noted that the lower arcuate edge 259 of the arm 251 extends concentric with the shaft 31 when the arm is in its lowered position so as to maintain the bail rod raised throughout the sweep of the bail rod about the rod 31.

In order to yieldably return the register gears 76 to zero registration, the accumulator shaft 74 is provided with a keyway in which is slideably mounted a key 255 (FIGS. 15 and 16). The latter has inclined edges which engage mating inclined edges, i.e., 256 and 257, formed at the bottom of the keyway so that as the key is moved leftwardly, it will be cammed radially outward to cause yieldable pads 258 formed thereon to frictionally engage the inner bores of the eccentric hubs 240. In lieu of a smooth inner bore, that portion of the bore in the path of the associated pad may be roughened or serrated to provide better driving relation between the shaft 74 and each register gear.

For the purpose of moving the key 255 to the left into coupling relation with the various register gears during totaling and subtotaling operations, a camming formation 265 (FIGS. 13 and 15) is formed on the camming arm 251 and is arranged to move between the right-hand end of the key and a stationary bracket 266 extending from the machine framework. Anti-friction balls 267 are mounted in sockets formed in the right-hand end of the key and in the camming formation to reduce friction. Thus, as the arm 251 is lowered, the key will be moved into driving relation with the register gears.

Figure 10:
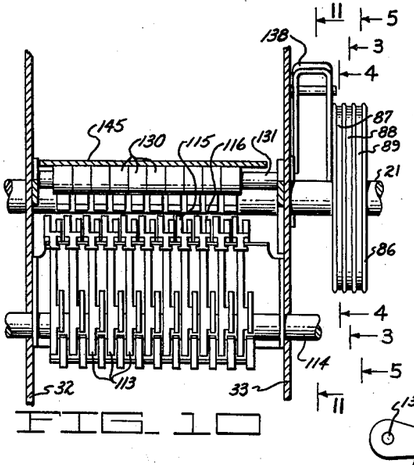
FIG. 10 is a sectional view illustrating part of the total taking mechanism of the accumulator and is taken substantially along the line 10—10 of FIG. 1.
Figure 10A:
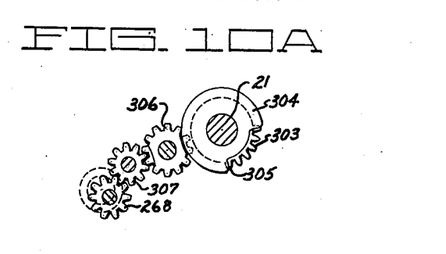
FIG. 10A is a sectional view illustrating the gearing for driving the accumulator shaft.

Means are provided for rotating the shaft 74 counterclockwise during the period that the shaft is in driving engagement with the register gears. As illustrated in FIG. 10A, a mutilated gear 303 and a disc 304 are suitably fastened in juxtaposition on the drive shaft 21. The disc 304 has a cutout section 305 in alignment with the teeth of gear 303. The latter is adapted to mesh with a wide pinion 306. The pinion extends across the width of both the gear 303 and the disc 304 and is also in continuous mesh with an idler 307 which, in turn, meshes with a gear 268 fastened on the accumulator shaft 74. That portion of the gear 306 in alignment with the gears 303 and 307 is fully toothed, but that portion which is in alignment with disc 304 has a pair of adjacent teeth cut away to form a bearing surface against which the periphery of the disc rides whereby to prevent rotation of the shaft 74 whenever the teeth of gear 303 are out of mesh with the pinion 306.

Describing now the means for controlling the levers 113, the latter are independently pivoted on the shaft 114 and each has two upstanding tines 115 and 116 (FIGS. 1, 10, 18, 19 and 21 to 24) which are spaced from each other lengthwise of the shaft and also at right angles thereto. The levers are located within a total stop frame 117 (FIGS. 1 and 17) which is also pivoted on the shaft 114. The latter frame has slots 118 therein embracing tails 120 on the levers 113 to limit relative movement between the levers and the frame. Each of the levers has a thin, flexible spring projection 121 integral therewith and engaging the frame 117 whereby to normally yieldably maintain the levers in their position shown in FIG. 1 relative to the frame. The frame 117 is normally held in a clockwise rocked position shown by tensioned spring 122 which maintains a stud 123 in engagement with a cam 124 secured to the drive shaft 21. In such position, the levers 113 are held out of cooperative relation with the flanges 110.

During each cycle, as indicated by item 5, FIG. 20, the cam 124 is effective to first move the frame 117 counterclockwise a sufficient amount to permit the total stop levers 113 (if they are otherwise permitted to do so) to also move counterclockwise an amount sufficient to sense any low levels 110 L of the register gears 76 which might be opposite the ears 112 of the associated levers 113. Shortly thereafter, at 75°, the cam 124 allows spring 122 to return the frame counterclockwise a partial amount sufficient to return any stop levers 113 which may have previously sensed the low levels of the respective register gear flanges 110 back to a position indicated in FIG. 22 where the intermediate portions 110 I may pass therebeneath so as to permit the zero stop shoulders 111 to limit against the ears 112. Later, at 210°, the cam 124 allows the spring 122 to fully retract the frame 117 and all levers 113 into their normal positions shown in FIG. 1.

Figures 18, 19, 22:
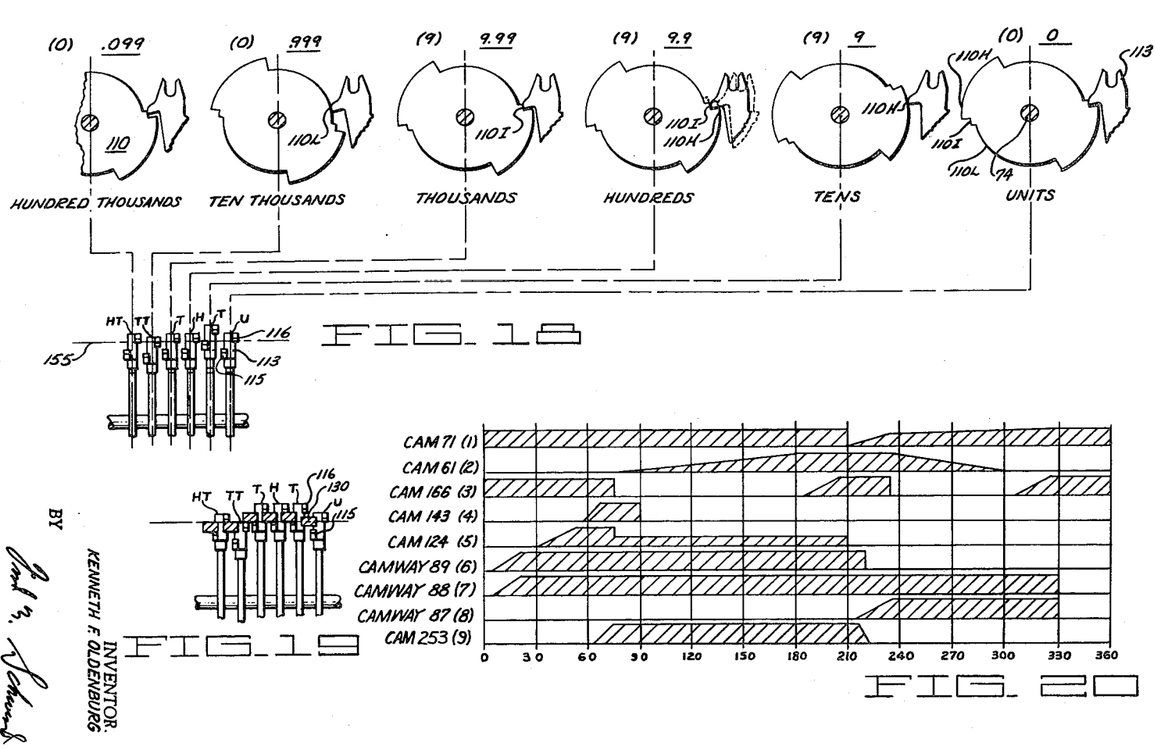
FIG. 18 is a diagrammatic view illustrating the relationship of the accumulator parts and total stop levers when registering an exemplary value.
FIG. 19 is a diagrammatic view illustrating the relationship of the total stop levers and total stop sensing wedges upon lowering of the latter into cooperative relation with the levers.
FIG. 22 is a view similar to FIG. 21 but illustrating a total stop lever and sensing wedge in a position sensing a register gear element set to register zero.

Means are provided for retracting certain of the total stop levers 113 at the start of a digitizing operation depending on the conditions of the adjacent levers in the next lower denominational orders. For this purpose, a series of camming or sensing wedges 130 (FIGS. 1, 10 and 21 to 24) are pivotally mounted independently of each other on a rod 131 located over the tines of the levers 113. As shown in FIGS. 10, 18 and 19, each wedge 130 extends over the tine 116 of the lever 113 in one order and over the tine 115 of the lever in the next lower order.

Figure 11:
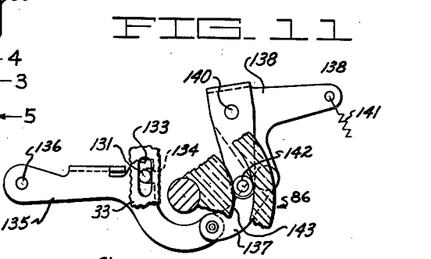
FIG. 11 is a sectional side view of the mechanism for actuating the total stop sensing wedges and is taken substantially along the line 11—11 of FIG. 10.

The rod 131 (FIG. 11) is guided at its opposite ends in vertically extending slots 133 formed in frame plates 32 and 33. The rod 131 is also embraced by slots 134 formed in the arms of a bail 135 which is pivotally supported at 136 and is connected through a link 137 to a cam follower bail 138. The latter is fulcrumed at 140 and is urged clockwise by a tensioned spring 141 to hold a roller 142 thereon in engagement with a cam formation 143 formed on the cam 86.

As indicated by item 4 of FIG. 20, the cam formation 143 is effective to cause cam follower 138 to rock clockwise, thereby lowering the wedges 130 into cooperative relation with the tines 115 and 116 of the levers 113 during the period extending from approximately 60° to 90° of the cycle and while the sensing levers 113 are allowed to move counterclockwise sufficiently to sense the lower levels 110 L of any of the register gears.

Describing now the cooperative relation between the total stop levers 113, the various register gears 76 and the camming wedges 130 during total or subtotal operations, it will be noted that when all register gears 76 register zeros, their intermediate portions 110 I will be located directly under the ears 112 of the levers 113 as indicated in FIG. 22. In such condition, if a total were attempted, the accumulator would be first moved to mesh with the sectors 14. Thereafter, the cam 124 will become effective to rock the frame 117 counterclockwise allowing the total levers 113 to sense the intermediate portions 110 I of the associated register gears. Shortly thereafter, the cam 143 will lower the wedges 130. In doing so, the wedges will merely cam along the left-hand surfaces 150 of the tines 116, causing the wedges to rock idly into position shown in FIG. 22. Subsequently, the accumulator shaft 74 will be rotated to frictionally drive the register gears 76 counterclockwise until the stop shoulders 111 arrest against the ears 112. Since only a very slight movement of the register gears will take place at this time, the sectors 14 will be arrested in their normal home positions wherein the zero printing characters 15 are presented to a print line substantially in line with the printing hammers 67.

Figures 21, 22:
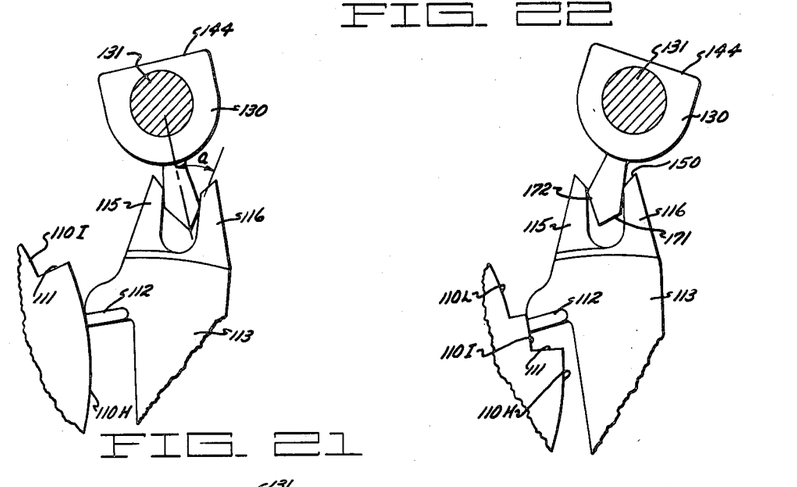
FIG. 21 is an enlarged fragmentary view illustrating a total stop and sensing wedge in the position sensing a register gear element positioned to register the digit value 9.

When a register gear registers a value other than zero at the start of a total or subtotal operation, a different portion of the flange 110 thereof will be presented to its stop ear 112. For example, if the gear registers an actual digital value between approximately 6 and 9.75, the high level 110 H will be presented as indicated in FIG. 21, whereas if the gear registers an actual value between approximately .25 and 5, the low level 110 L will be presented, while if the gear registers between approximately 9.75 and .25, the intermediate level 110 I will be presented.

As a further example, if two adjacent orders of the accumulator register the nominal value 09, the lower order register gear 76 will be set at 9 and the higher order gear 76 will be set at .9 due to the fractional tens carry transmitted from the lower order gear 76. This movement will be sufficient to move the intermediate level 110 I of the higher order register gear clockwise past the associated ear 112. Accordingly, the total stop levers will assume their positions shown in FIG. 24 when the frame 117 is rocked fully counterclockwise. When the wedges 130 are lowered, the wedges associated with these levers will cam counterclockwise idly along the surface 152 of the tine 115 on the lower order stop lever and also along the rear side 151 of the tine 116 of the higher order stop lever.

Approximately at the start of rotation of the accumulator shaft 74 to return the register gears toward zero, the cam 124 will operate to retract the higher order stop lever to the level of the intermediate portion 110 I of its register gear 76. Accordingly, when the register gears are rotated, the lower order register gear 76 will be moved counterclockwise through nine increments until its zero stop shoulder 111 arrests against its total stop lever. Likewise, the higher order register gear 76 will be moved counterclockwise. The higher order register gear 76 will be arrested at zero first, but since no loads are imposed by the detent shoulders 69 of the associated sector 14 at this time, no excessive binding or dragging will be reflected back to the next lower order gear.

Figure 23:
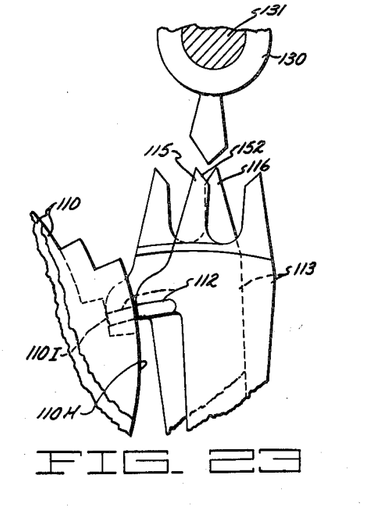
FIG. 23 is an enlarged fragmentary view illustrating the relative positions of two adjacent total stop levers when sensing respective register gear elements set to register the true value 99, prior to lowering of the sensing wedges.
Figure 24:
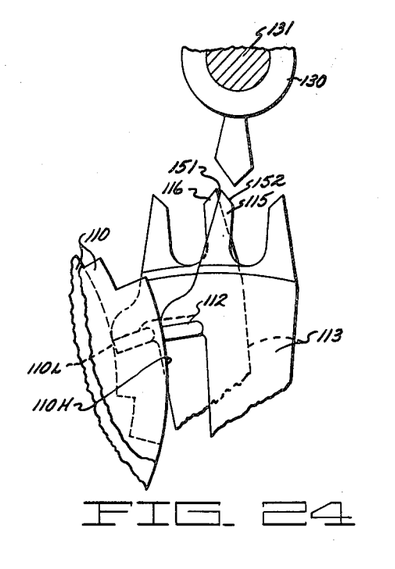
FIG. 24 is a view similar to FIG. 23 illustrating the register gear elements set to register the true value 09, prior to lowering of the sensing wedges.

Considering now an example where the value 99 is registered by two adjacent orders, the normal relative positions of the two register gears and their associated total stop levers prior to lowering of the wedges 130 is depicted in FIG. 23. Here, the lower order register gear presents its high level 110 H to its total stop lever but the higher order register gear which actually registers 9.9 will normally present its intermediate level 110 I although it may possibly present its higher level 110 H if inaccuracies are present in the entrained gears. If the condition shown in FIG. 23 prevails, subsequent lowering of the wedge 130 common to both such stop levers will cause the same to cam along the surface 152 of the tine 115 of the lower order lever and thereby cam the higher order stop lever clockwise to position its ear 112 above the high level of its respective gear flange so that both gears may be driven subtractively by the accumulator shaft through nine increments to zero. Any fractional carry into the next higher order register gear will be retracted during such operation.

In the next higher order, the total stop lever 113 will be raised by the action of cam 124 to an intermediate level so as to arrest the respective gear at zero.

Consider now an example where the accumulator registers the value 009990 and a totaling operation is to be performed. In such case, as depicted diagrammatically in FIG. 18, the flanges 110 of the various register gears 76 would be positioned as shown relative to the total stop levers 113. That is, the various register gears and their flanges 110 would actually register the underlined values indicated directly thereabove while the true or nominal registrations are indicated in parenthesis.

When the total stop levers 113 are allowed to sense the flanges 110, they will assume the relative positions (viewed in plan) shown in the lower left-hand corner of FIG. 18 relative to a reference line 155. That is, the units order stop lever 113 will engage the intermediate level of the associated flange 110. The tens order stop lever will engage the outer level of its associated flange 110. In the hundreds order, the register gear and its flange will register 9.9. Accordingly, the associated stop will normally be blocked in its intermediate position shown in full lines where it will rest on the intermediate level of the flange or it may possibly be blocked in its outermost position shown in dotted lines if inaccuracies in the gear train were present. In the thousands order, the register gear 76 and its flange 110 will stand at 9.99 or substantially 0 and therefore, its total stop lever will assume substantially the same position that the zero stop lever in the units order assumes. In the ten thousands order, although no digitation has taken place, the gear will stand at .999 or practically 1 as the result solely of tens carry from the three lower orders. Thus, the total stop lever will drop to its lowermost position. The hundred thousands order, registering .09, will present its intermediate level to its stop lever.

Now, when the wedges 130 are lowered as indicated in the diagrammatic plan view of FIG. 19, the units and tens order stop levers U and T, respectively, will be unaffected. The hundreds order stop lever H will be cammed back to its position illustrated if it is not already held there by its respective gear flange. The thousands order stop lever T will be cammed back by the associated wedge 130 cooperating with the stop lever H since the relationship depicted in FIG. 23 will prevail. The ten thousands order stop lever TT which, at this time, senses the lower level of its respective gear flange, is allowed to remain in contact therewith. Obviously, the hundred thousands lever HT will sense the intermediate level of its associated flange and will not be moved by the associated wedge. Now, at 75°, the frame 117 will be partially retracted to raise the ten thousands lever above the intermediate level 110 I. Accordingly, the register gears 76 will be permitted to advance to likewise advance the sectors to present the type characters 009990 to the print line.

Means are provided for retracting the printing sectors 14 a slight amount, i.e., approximately equal to one-fourth the circular pitch of the gear teeth on the sectors and in a counterclockwise direction when the machine is at rest as well as during the early stages of a cycle and during the printing operation. Such retraction of the sectors enables any of the lowermost stop pins 12 representing zero to be set while permitting shifting of the pin carriage without the possibility of engagement with the shoulders 41 of the sectors. Also, such setting ensures that a maximum amount of tolerance in the accumulator parts may be accepted while ensuring reliable operation thereof, particularly during totaling and subtotaling operations. For this purpose, an aligner 156 (FIGS. 1 and 9) is provided which extends along all the printing sectors. The aligner is pivoted at 158 on a bail 160 which is fulcrumed on a stationary rod 161 and is normally held in a counterclockwise rocked position relative to the bail 160 by a tension spring 159. The bail 160 is connected through a pin and slot connection 162 to a cam follower 163. The latter is fulcrumed on the shaft 114 and carries a stud 164 which is held by a tension spring 165 against the periphery of an aligner control cam 166 secured to the drive shaft 21.

When the aligner is rocked into engagement between two adjacent teeth on the sectors 14, the bail 160 will continue to rock counterclockwise slightly, effecting a toggle action which retracts the sectors slightly in a counterclockwise direction.

As shown at item 3, FIG. 20, the aligner 156 is in engaged position when the machine is at rest and is held in such position until approximately 75° in the cycle. Thus, during totaling and subtotaling operations wherein the total stop levers are caused to cooperate with the register gears 76 of the accumulator, such gears are retracted slightly clockwise (see FIG. 22) so as to ensure that the proper levels of the register elements are presented to the respective stop ears 112 in spite of any inaccuracies in the accumulator parts. Just prior to the printing operation, the aligner is again moved into aligning position to align and slightly advance the sectors to positions where they are held until after the printing operation and just prior to commencement of the sector return movement at 220°. Thus, the appropriate type characters are properly aligned with each other and with the hammers during printing.

It will be noted in FIGS. 1 and 12 that a ledge 127 on the blocking plate 104 normally, i.e., when the pin carriage is in its home position, lies outside the paths of movement of lugs 125 on the total stop levers 113, thus permitting the same to move into cooperative relation with the flanges 110.

Various features disclosed herein are disclosed and claimed in the following copending applications:

H. L. Clary et al., Serial No. 140,336, filed September 25, 1961.
B. F. Kuhne, Serial No. 140,544, filed September 25, 1961.
B. F. Kuhne, Serial No. 140,545, filed September 25, 1961.
K. F. Oldenburg et al., Serial No. 140,547, filed September 25, 1961.
K. F. Oldenburg et al., Serial No. 140,549, filed September 25, 1961.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In a calculating machine,
the combination with
an accumulator having
a series of denominationally arranged register elements,
digitizing gears therefor, and
crawl tens transfer mechanism entrained with said gears and said register elements;
and differential actuators for said digitizing gears;
of totaling means for said accumulator comprising
zero stops carried by said register elements,
total stops,
totaling control means for effecting cooperative relation between said total stops and said zero stops whereby to arrest said register elements at zero registration,
and means controlled by said totaling control means for actuating said register elements toward zero registration independently of said actuators and said digitizing gears.

2. In a calculating machine,
the combination with
an accumulator having
a series of denominationally arranged register elements,
digitizing gears therefor, and
crawl tens transfer mechanism entrained with said gears and said register elements;
differential actuators for said digitizing gears;
and means for driving said actuators,
of totaling means for said accumulator comprising
zero stops carried by said register elements,
total stops,
totaling control means for effecting cooperative relation between said total stops and said zero stops whereby to arrest said register elements at zero registration,
means controlled by said totaling control means for actuating said register elements toward zero registration independently of said actuators and said digitizing gears,
and means controlled by said totaling control means for disabling said drive means.

3. In a calculating machine,
the combination with
an accumulator having
a series of denominationally arranged register elements,
digitizing gears,
gear means intermediate said gears and respective ones of said register elements, said gear means including
crawl tens transfer mechanism entrained with said gears and said register elements;
differential actuators for said digitizing gears,
drive means,
normally effective coupling means intermediate said drive means and said actuators,
and means responsive to operation of said drive means for engaging said actuators with said digitizing gears;
of totaling means for said accumulator comprising
zero stops carried by said register elements,
total stops,
totaling control means for effecting cooperative relation between said total stops and said zero stops whereby to arrest said register elements at zero registration, said totaling control means being effective to cause operation of said drive means, and means controlled by said totaling control means for actuating said register elements toward zero registration independently of said actuators and for disabling said coupling means.

4. In a calculating machine,
the combination with
an accumulator having
a series of denominationally arranged registering elements,
digitizing gears,
gear means intermediate said gears and respective ones of said register elements, said gear means including
crawl tens transfer mechanism entrained between said gears and said register elements;
and differential actuators for said digitizing gears,
of totaling control means for said accumulator comprising
zero stops carried by said register elements,
total stops,
totaling control means for effecting cooperative relation between said total stops and said zero stops whereby to arrest said register elements at zero registration,
means controlled by said totaling control means for moving said accumulator to mesh said digitizing gears with said actuators,
means on said accumulator for driving said register elements toward zero registration,
and means controlled by said totaling control means for causing said driving means to drive said register elements toward zero independently of said actuators.

5. In a calculating machine,
the combination with
an accumulator having
a shaft,
a series of denominationally arranged register elements carried by said shaft,
digitizing gears carried by said shaft,
gear means intermediate said gears and said register elements,
said gear means including
crawl tens transfer mechanism entrained between said gears and said register elements;
and differential actuators for said digitizing gears;
of totaling control means for said accumulator comprising
zero stops carried by said register elements,
total stops,
totaling control means for effecting cooperative relation between said total stops and said zero stops,
normally disabled means on said shaft for driving said register elements,
and means controlled by said totaling control means for moving said shaft to mesh said accumulator with said actuators and to enable said driving means and to rotate said shaft whereby to drive said register elements to zero registration.

6. In a calculating machine,
the combination with
an accumulator having
a series of denominationally arranged register elements,
digitizing gears,
gear means intermediate said gears and respective ones of said register elements, said gear means including
crawl tens transfer mechanism entrained with said gears and said register elements;
differential actuators for said digitizing gears,
drive means,
pressure releasable coupling means intermediate said drive means and said actuators,
and means responsive to operation of said drive means for engaging said actuators with said digitizing gears;
of totaling means for said accumulator comprising
zero stops carried by said register elements,
total stops,
totaling control means for effecting cooperative relation between said total stops and said zero stops whereby to arrest said register elements at zero registration, said totaling control means being effective to cause operation of said drive means,
and means controlled by said totaling control means for actuating said register elements toward zero registration independently of said actuators and digitizing gears and for releasing said coupling means.

References Cited in the file of this patent

UNITED STATES PATENTS

| | | |
|---|---|---|
| 2,645,425 | Bliss | July 14, 1953 |
| 2,832,531 | Chall | April 29, 1958 |
| 3,007,633 | Gang | Nov. 7, 1961 |

FOREIGN PATENTS

| | | |
|---|---|---|
| 438,351 | Italy | Aug. 6, 1948 |